US006619962B1

(12) United States Patent
Gubitosi et al.

(10) Patent No.: US 6,619,962 B1
(45) Date of Patent: Sep. 16, 2003

(54) TOY APPARATUS AND METHOD OF USING SAME FOR PROMOTING GROSS MOTOR DEVELOPMENT IN CHILDREN

(75) Inventors: Domenic T. Gubitosi, East Aurora, NY (US); Jerry A. May, Colden, NY (US); Kenneth G. Parker, Williamsville, NY (US)

(73) Assignee: Mattel, Inc., El Segundo, CA (US)

( * ) Notice: Subject to any disclaimer, the term of this patent is extended or adjusted under 35 U.S.C. 154(b) by 0 days.

(21) Appl. No.: 09/855,691

(22) Filed: May 16, 2001

(51) Int. Cl.⁷ .................. G09B 19/00; A63H 33/00
(52) U.S. Cl. .................. 434/258; 434/247; 446/168; 273/118 R
(58) Field of Search .................. 434/258, 255, 434/247; 446/168, 169–174, 444; 33/15 P; D21/564; 473/167; 482/142, 140; 273/118 R

(56) References Cited

U.S. PATENT DOCUMENTS

| | | | |
|---|---|---|---|
| 1,252,158 A * | 1/1918 | Okel .................. 273/120 R |
| 1,279,270 A * | 9/1918 | Cole .................. 446/168 |
| 1,590,242 A * | 6/1926 | Howard .................. 273/112 |
| 1,615,342 A * | 1/1927 | Nelson .................. 273/120 A |
| 1,769,327 A | 7/1930 | Wood | |
| 2,254,488 A | 9/1941 | Miller | |
| 2,634,128 A | 4/1953 | Reed | |
| 2,729,914 A * | 1/1956 | Cook .................. 446/168 |
| 2,838,270 A * | 6/1958 | Morse .................. 446/168 |
| 2,895,257 A | 7/1959 | Morss | |
| 3,028,704 A | 4/1962 | Rumbaugh | |
| 3,533,625 A | 10/1970 | Kossor et al. | |
| 3,946,516 A * | 3/1976 | Wirth .................. 446/117 |
| 4,078,330 A | 3/1978 | Roth | |
| 4,175,665 A | 11/1979 | Dogliotti | |
| 4,348,028 A * | 9/1982 | Barlow .................. 273/249 |
| 4,713,038 A * | 12/1987 | Wichman et al. .................. 446/168 |
| 4,861,309 A * | 8/1989 | Williams et al. .................. 446/168 |
| 4,863,169 A | 9/1989 | Miyazaki | |
| 4,932,917 A * | 6/1990 | Klitsner .................. 446/168 |
| 4,971,593 A * | 11/1990 | Mayhall et al. .................. 211/70 |
| 5,312,285 A | 5/1994 | Rieber et al. | |
| 5,683,298 A * | 11/1997 | Jackson .................. 273/442 |
| 5,735,724 A * | 4/1998 | Udagawa .................. 40/409 |
| 5,785,005 A | 7/1998 | Udelle et al. | |
| 5,888,115 A * | 3/1999 | Shoemaker et al. .................. 446/168 |
| 5,924,907 A | 7/1999 | Tobin | |
| 5,944,575 A * | 8/1999 | Tolnay .................. 446/128 |
| 6,056,620 A | 5/2000 | Tobin | |
| 6,056,623 A * | 5/2000 | Arriola .................. 135/124 |
| 6,386,538 B1 * | 5/2002 | Mejia .................. 273/118 R |

FOREIGN PATENT DOCUMENTS

| | | |
|---|---|---|
| DE | 338468 | 6/1921 |
| DK | 65990 | 11/1947 |
| SU | 1468552 | 3/1989 |

OTHER PUBLICATIONS

Playskool "Busy Balls" product brochure, undated; 1 page.
Playskool "Ball Spiral" product brochure; undated; 1 page.

* cited by examiner

Primary Examiner—Derris H. Banks
Assistant Examiner—Dmitry Suhol
(74) Attorney, Agent, or Firm—Cooley Godward LLP

(57) ABSTRACT

A toy for promoting gross motor development includes a base and a support communicating with the base. The toy also includes an activity area disposed on the support above the base. The activity area is attractive to an infant and encourages the infant to reach up to the activity area by pulling up from a seated position to a standing position using handles or grips disposed on the support or the activity area. The toy also includes sensory output generators configured to encourage the infant to pull up using the handles or grips to reach the activity area. The toy further includes a track coupled to the support and positioned between the top activity area and the base. The track is configured for guiding an object between the top and the base. The top activity area, track, and gripping regions interact to provide an enjoyable and stimulating toy for the child while at the same time promoting the child's gross motor development.

42 Claims, 16 Drawing Sheets

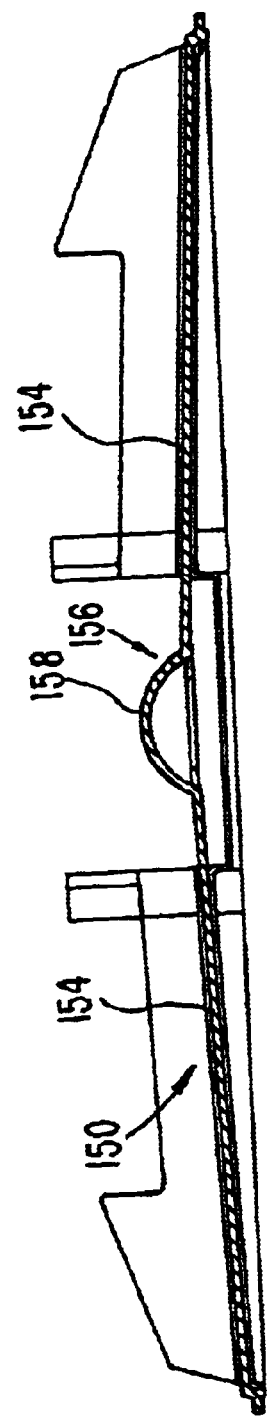

TOY APPARATUS AND METHOD OF USING SAME FOR PROMOTING GROSS MOTOR DEVELOPMENT IN CHILDREN

BACKGROUND

1. Field of the Invention

The present invention relates generally to toys, and more particularly, to a toy and method of using the toy for promoting gross motor development in children.

2. Discussion of the Related Art

Toys employing various types of runways, chutes, or other similar structures have been provided for balls, marbles, toy cars, and the like. These toys appeal to young children, particularly infants, because they enjoy watching the balls or other objects descend along or through the structures. Conventional toys have therefore focused on the development and stimulation of the child's visual amusement.

One known toy includes a base structure and a plurality of interconnecting channel members and column sections adapted to be arranged in various configurations on the base structure to form one or more continuous paths through which a ball can travel downwardly to the base. The entrance and exit columns of the channel members are configured so that the lower end of an exit column of one channel member can only be interconnected with the upper end of an entrance column of another channel member. This construction allows the child to construct multiple levels of channels for the ball to travel down. The toy is designed such that the various channel members slow the speed of the ball and increase the action movements of the ball as it descends through the game to provide visual amusement to the child for a prolonged period of time.

Another example of a conventional toy includes a base, a hollow column, and a plurality of spiral ball tracks coupled to and communicating with the column. The tracks are configured such that when a child places a ball at the top of one of the tracks, the ball rolls down the track and into the hollow column where it drops to the next track below. The ball then follows this lower track into the column where it drops to the next lower track. This process continues until the ball reaches the base. The child can then repeat this process by placing one of the balls at the top of the track or in any one of the lower tracks.

A problem with conventional toys is that they tend to focus on entertaining the child through visual stimulation while failing to provide means for promoting the child's physical gross motor development, such as an infant's transition from sitting to standing. Instead, these toys are primarily designed for one-dimensional use as amusement devices for small children. As the design of toys has progressed, however, parents, teachers, and other individuals involved in child-care have sought and/or demanded toys that provide a multifunctional yet economical approach to child development.

In light of these demands, there is a need for an improved approach which incorporates visual or audible attractions, such as descending objects, lights, sounds, or the like while at the same time providing an incentive for the child to physically interact with the device. The better approach would be designed to support the child's body weight and incorporate means such as grips or handles to allow the child to pull up from a seated position to a standing position in order to play with the device. This combination of visual, audible, and physical interaction with the toy would aid in the promotion of gross motor development, especially for infants, while at the same time provide an entertaining device to be used for a prolonged period of time. The nature of the operation of such a toy would require coordination of the eyes, hands, and body that could also have applicability in physical therapy for small children.

Thus, there is a need in the art for a toy that substantially obviates the limitations and disadvantages of conventional toys. Particularly, there is a need for a toy that provides for visual, audible, and physical interaction with the toy and that aids in the promotion of gross motor development.

SUMMARY OF THE INVENTION

The present invention solves the problems with, and overcomes the disadvantages of, conventional toys. In particular, the present invention relates to a toy that not only provides entertainment for a small child, such as an infant, but also promotes the infant's gross motor development.

The invention includes a base and a support communicating with the base. An activity area is disposed on the support above the base. The activity area is attractive to an infant and encourages the infant to reach up to the activity area by pulling up from a seated position to a standing position using handles or grips disposed on the support or the activity area. The invention also preferably includes sensory output generators configured to encourage the infant to pull up using the handles or grips to reach the activity area. The sensory output generators also provide visual or audible stimulation to reward the infant as the infant interacts with the activity area.

In another aspect, the invention includes a track or ramp coupled to the support and positioned between the top activity area and the base. The track is configured for guiding an object between the top and the base. The track preferably includes a gripping region formed thereon with a corresponding opening which allows an infant to place a portion of the infant's hand into the opening so that the infant can grasp the gripping region. The gripping region formed in the track allows the child to pull up from a sitting position to a standing position so that the child can reach the top activity area. The top activity area, track, and gripping regions interact to provide an enjoyable and stimulating toy for the child while at the same time promoting the child's gross motor development.

BRIEF DESCRIPTION OF THE DRAWINGS

FIG. 4b is a sectional view of the base insert taken along line 4b—4b of FIG. 4a;

FIG. 5b is an exploded side view of the support of FIG. 5a;

DETAILED DESCRIPTION

Figure 1:
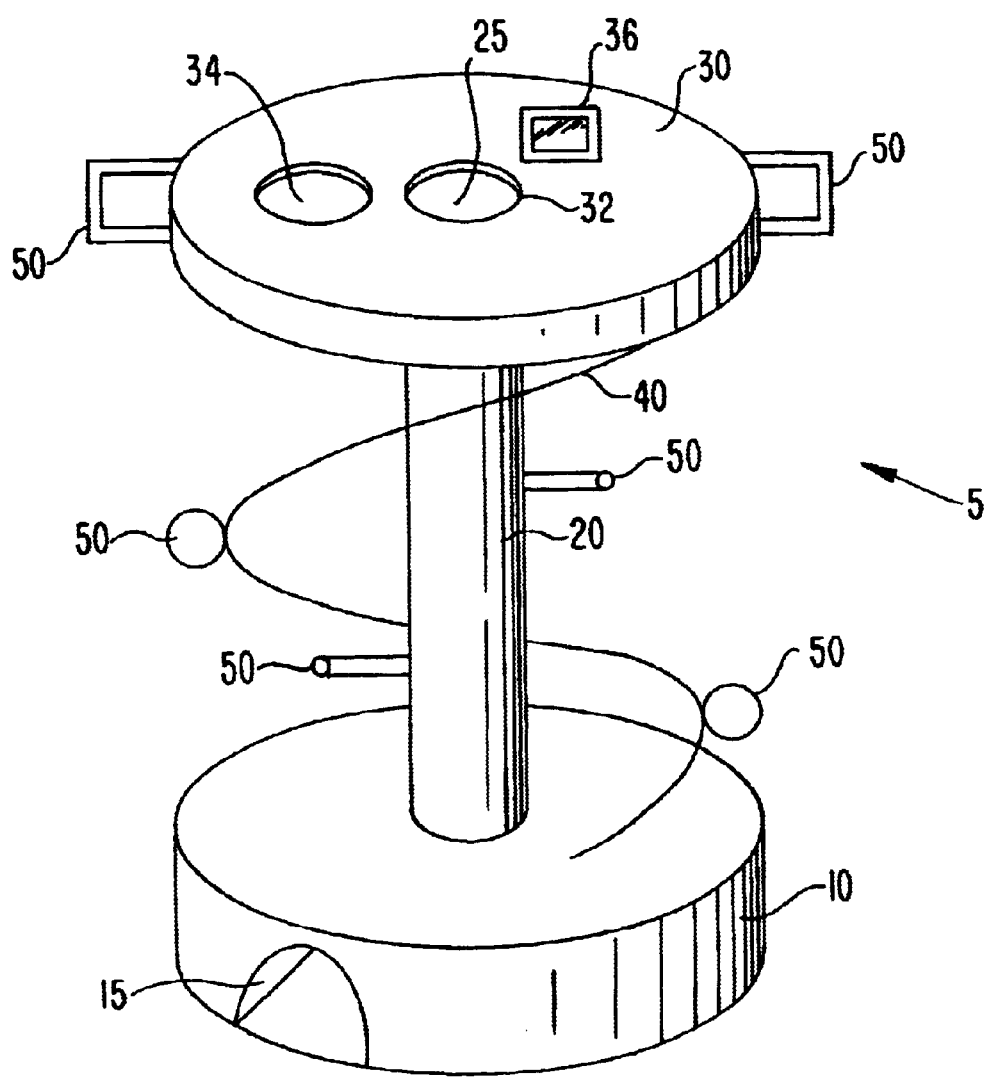
FIG. 1 is a perspective view of one embodiment of a toy embodying the principles of the present invention.

A toy 5 schematically illustrating the general principles of the present invention is shown in FIG. 1. The toy 5 includes a base 10, a support 20, a top 30, and a track 40. Base 10 is designed and constructed to provide stability to the toy 5 to support the weight of an infant or other small child while the infant is interacting with the toy 5 in a manner which will be described in more detail below. Support 20 preferably extends between and is coupled to base 10 and top 30. Support 20 is also dimensioned and constructed to support the top 30 and to provide structural stability to support the weight of an infant or other small child. Top 30 is disposed at the upper end of support 20 and includes an activity area disposed at upper side of top 30 which provides an incentive to an infant or small child to reach up to top 30. Track 40 is disposed, and extends between top 30 and base 10. Track 40 is preferably coupled to support 20, but track 40 could be formed in a free standing or similar configuration. Track 40 is arranged to convey an object from the top 30 to the base 10, at least partially outside support 20.

The toy 5 also preferably includes a plurality of grips or handles 50 disposed above the base 10 and at or below the top 30 (such as on the top 30, the track 40, and/or the support 20). Grips 50 can be formed in any well-known manner or shape to allow an infant or other small child to easily grasp the grips 50 while interacting with the toy 5. In preferred embodiments, the grips 50 are arranged to allow an infant user to successively grasp grips 50 to pull up from a seated position to a standing position beside toy 5 whereby the infant can interact with the activity area disposed on top 30. The grips 50, along with the base 10, support 20, top 30, and track 40, sustain the weight of the infant while the infant is pulling up into the standing position and provide a stable support for the infant while in the standing position.

Base 10 includes an interior, which includes a plurality of passageways formed therein. In preferred embodiments, the passageways communicate with openings 15 formed in base 10 to allow an object to travel from the interior of base 10 to the exterior of base 10. Support 20 includes a passageway 25 formed therein extending along the entire length of support 20 from the top 30 to the base 10. In an alternative embodiment, passageway 25 could extend along a portion or multiple portions of the length of support 20. Passageway 25 is configured to allow an object to travel from the top 30 to the base 10. A number of openings 32, 34 are disposed in top 30 and configured to allow an object to pass through openings 32, 34. Top 30 also preferably includes at least one sensory output generator 36, for example, a light, speaker, or other similar device which adds to the infant user's enjoyment of toy 5 and rewards the infant for reaching the activity area of top 30. In preferred embodiments, track 40 is in the shape of descending spiraling levels about support 20. Track 40 is also dimensioned and constructed to provide structural stability to support the weight of an infant or other small child.

Figure 2:
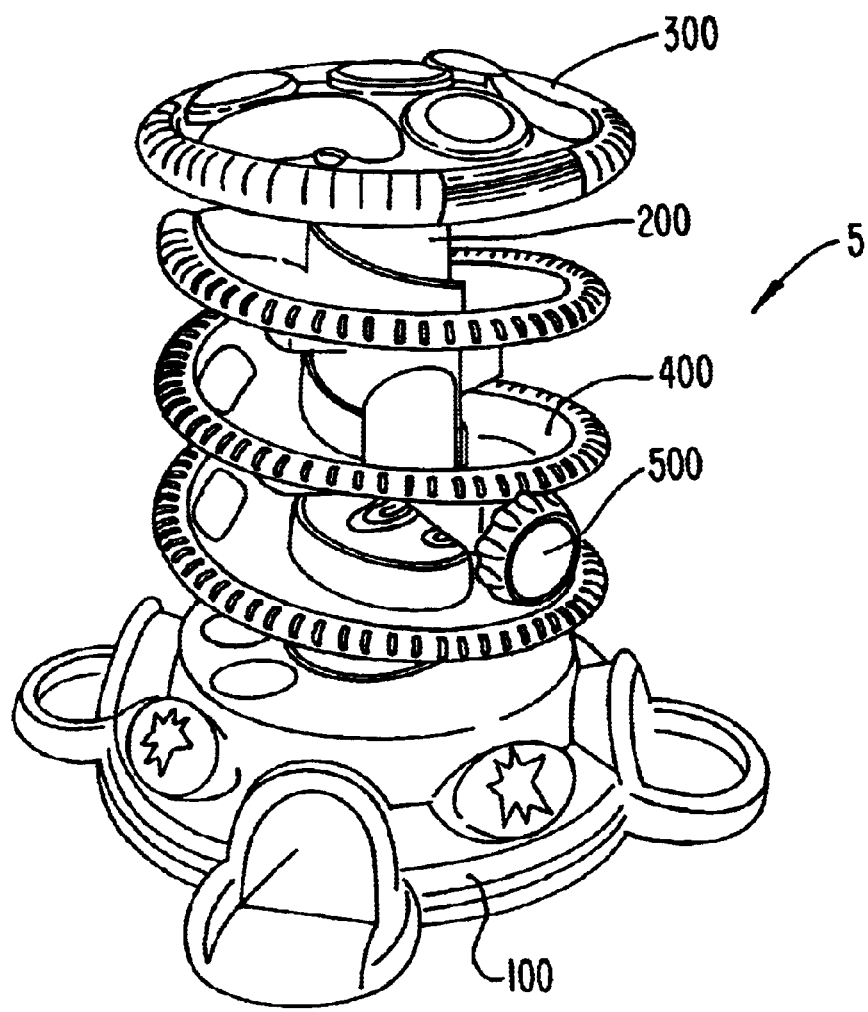
FIG. 2 is a perspective view of a second embodiment of a toy embodying the principles of the present invention.
Figure 8:
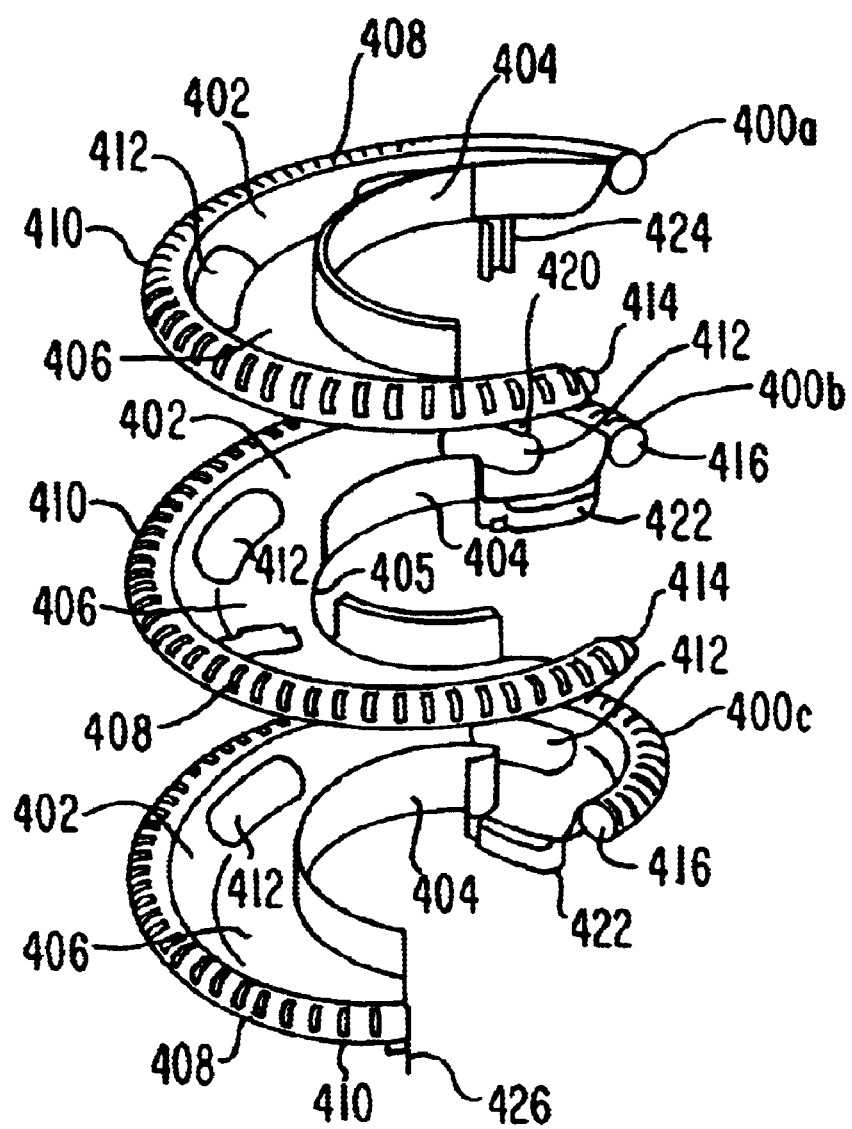
FIG. 8 is an exploded perspective view of the track on the toy of FIG. 2.
Figure 9A:
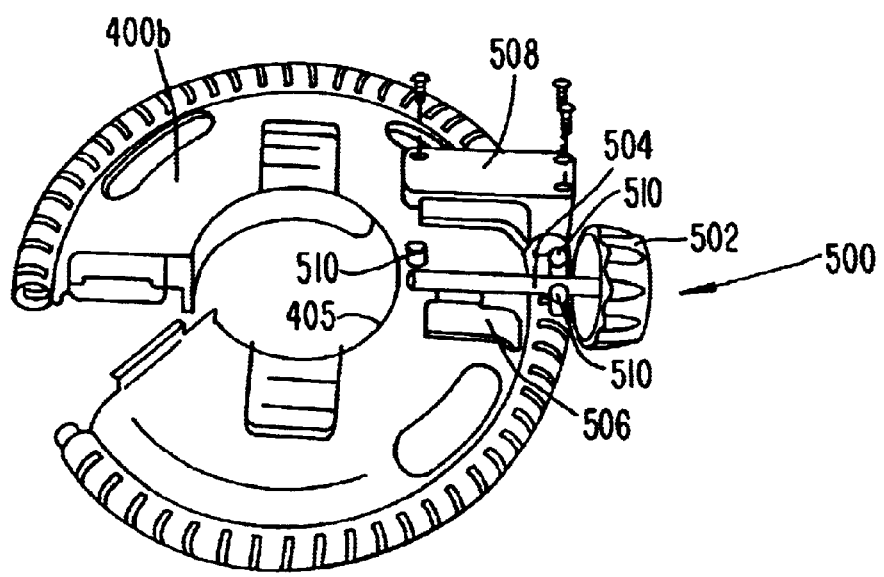
FIG. 9a is a bottom perspective view of one of the track sections of FIG. 8 illustrating the mounting of a deflecting gate.
Figure 9B:
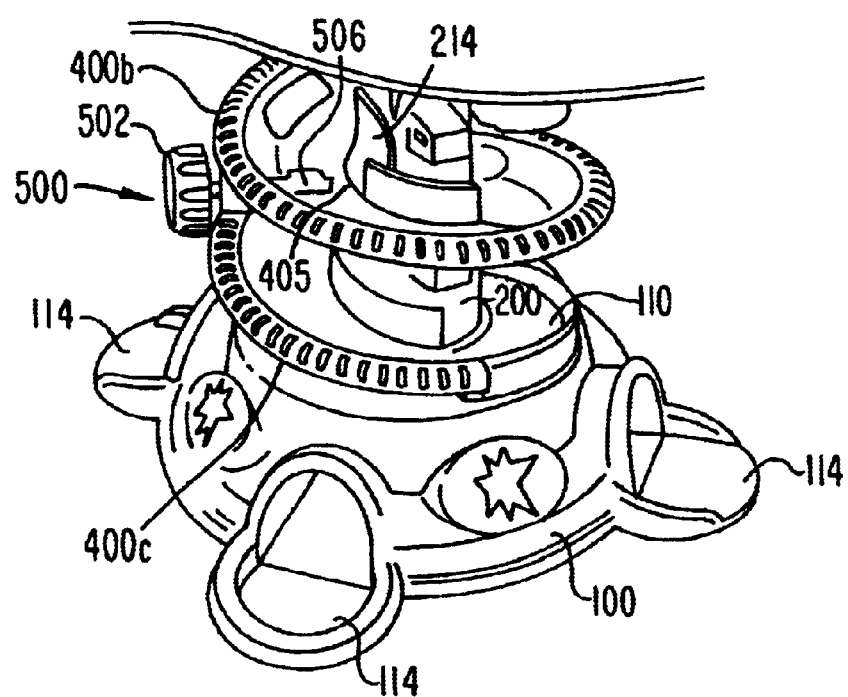
FIG. 9b is a partial perspective view of the deflecting gate of FIG. 9a mounted on a portion of the track in the closed position.

An exemplary implementation of a toy embodying the principles of the invention illustrated schematically in FIG. 1 is shown in FIG. 2. The toy 5 includes a base 100 (FIGS. 3, 4a–4d), a support 200 (FIGS. 5a and 5b), a top activity area or top 300 (FIGS. 6a–6c), and a track 400 (FIG. 8). In preferred embodiments, the toy 5 also includes a gate 500 (FIGS. 9a–9b).

Figure 3:
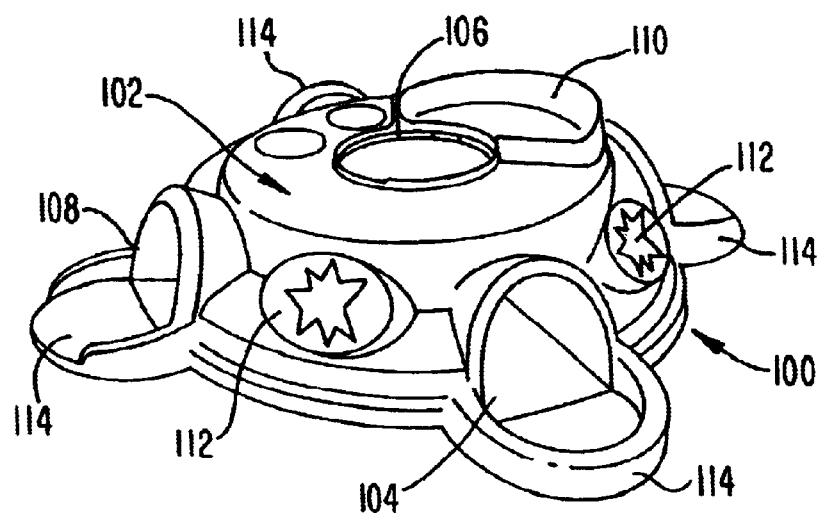
FIG. 3 is a perspective view of the base for the toy of FIG. 2.

Referring to FIG. 3, the base 100 includes an exterior, shown generally at 102, and an interior, shown generally at 104. Base 100 also includes an opening 106 formed in the top of base 100 in communication with the interior 104 of base 100. Opening 106 can be formed at any location on the top of base 100, but it is preferable that opening 106 is formed substantially in the center of the top of base 100. Base 100 also includes at least one opening 108 formed in a side of base 100 and also in communication with the interior 104 of base 100. In preferred embodiments, base 100 includes a plurality of openings 108 as shown in FIG. 3. Opening 106 and the plurality of openings 108 are dimensioned and configured to allow an object to pass from the exterior 102 to the interior 104 of base 100, and vice versa.

Base 100 also includes a ramp section 110 in communication with opening 106. Ramp section 110 can be formed integrally with base 100 or may be formed separately and coupled to base 100 using any well-known fastening method. Ramp section 110 is configured to permit an object to travel along a portion of the ramp section 110 into opening 108 and thereafter into the interior 104 of base 100.

In order to provide enhanced stability to base 100, base 100 also preferably includes a plurality of extensions or feet 114. Extensions 114 can be formed integrally with base 100 or can be formed separately from base 100 and coupled thereto using any well-known connecting means. Any number of extensions 114 can be provided but it is preferred to include four extensions as shown in FIG. 3. Extensions 114 are formed integrally at each of openings 108 and in communication therewith. In preferred embodiments, two of the extensions 114 are formed in the shape of a cup or similar structure so that an object traveling through the adjacent opening 108 is captured within extension 114. In addition, two of the extensions 114 are formed so that an object passing through adjacent opening 108 travels across extension 114 and onto the floor or other surface upon which base 100 rests. Base 100 also preferably includes one or more areas 112 upon which decorative labels or other ornamental features can be applied. These areas add to the overall aesthetic value of toy 5 and are intended to be pleasing to the child or infant user.

Figure 4A:
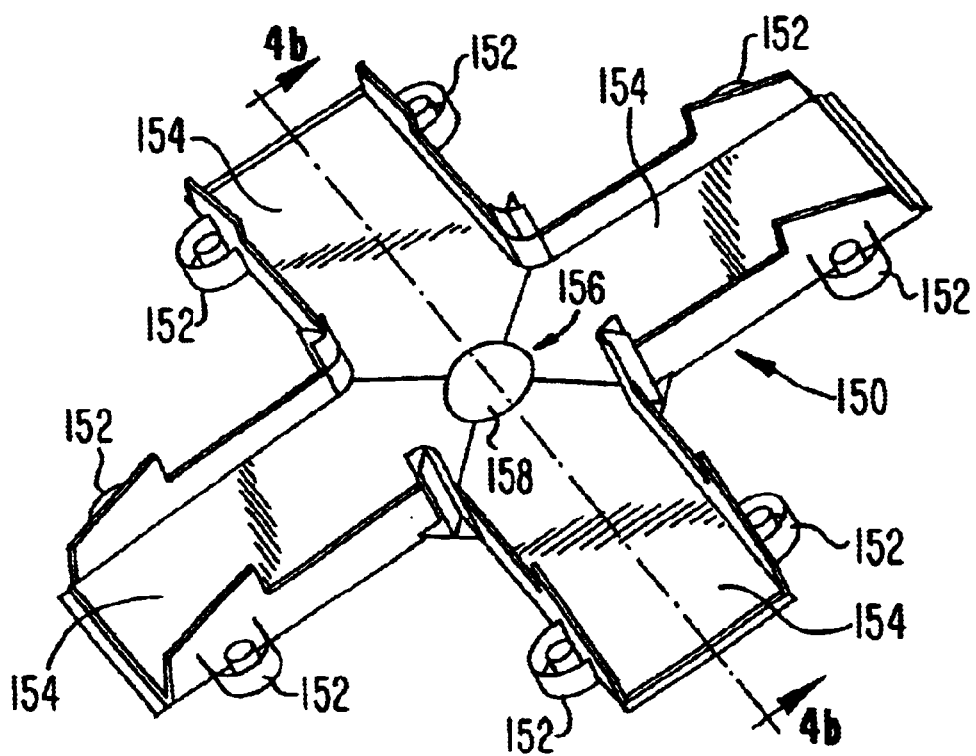
FIG. 4a is a perspective view of a base insert for use with the base of FIG. 3.

Base 100 also includes a base insert 150, as illustrated in FIGS. 4a and 4b, coupled to the underside of base 100. Base insert 150 may be coupled to the underside of base 100 using any well-known connecting mechanisms, however, in preferred embodiments, base insert 150 is coupled to the underside of base 100 using screws (not shown) inserted through tabs 152 into the underside of base 100. Base insert 150 can also be formed integrally as part of base 100.

Base insert 150 also includes a plurality of pathways 154 emanating from a common area 156. Each of the pathways 154 is formed with a generally descending slope from the common area 156 to the end of the pathway 154, as illustrated in FIG. 4b. In this configuration, an object can travel from the common area 156 to the end of the pathway 154 under the influence of gravity, without requiring an external force to be applied to the object. In preferred embodiments, each of the pathways 154 communicates with a corresponding opening or openings 108 in base 100 to provide a travel path for an object from the interior 104 to the exterior 102 of base 100.

Base insert 150 also preferably includes a diverter 158 disposed in common area 156. Diverter 158 can be formed integrally with base insert 150 or can be coupled to base insert 150 using any well-known fastening methods. Diverter 158 can comprise numerous shapes and configurations but in preferred embodiments it takes the shape of a hemisphere, as illustrated in FIG. 4b. Diverter 158 is shaped and configured to convert an object's substantially vertical travel path or velocity component into a substantially horizontal travel path or velocity component. For example, as an object enters base 100 through opening 106 in the top of base 100 (FIG. 3), the object is traveling in a substantially vertical direction with a substantially vertical velocity component. The object contacts the upper portion of diverter 158 whereby it rolls down a portion of diverter 158 until contacting one of the plurality of pathways 154 formed in base insert 150. The object then continues along one of the sloped plurality of pathways 154 and through one of the corresponding openings 108. Diverter 158 is designed to provide random selection of the pathways 154 and openings 108 to increase the child's enjoyment of the toy.

Figure 4C:
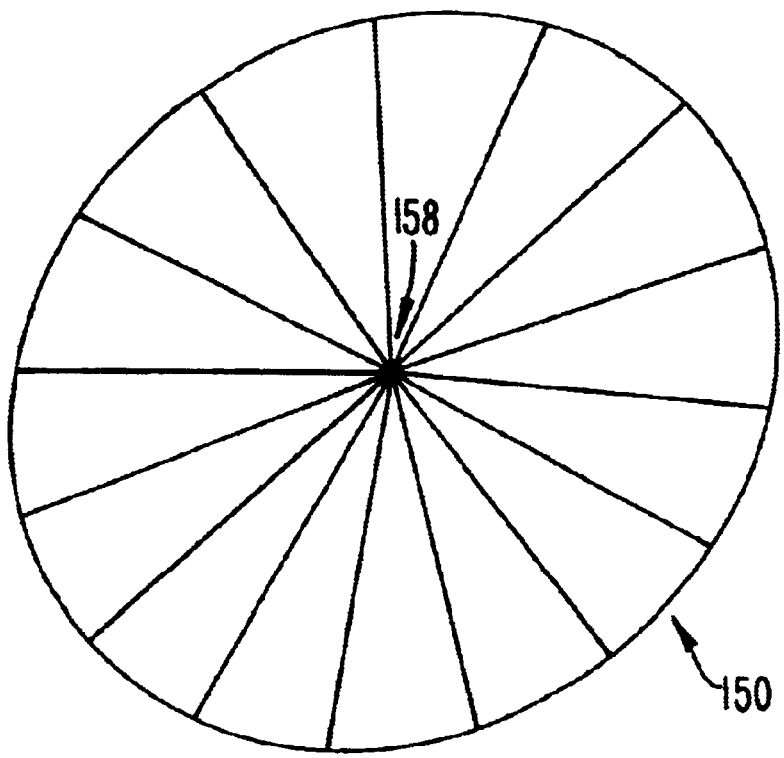
FIGS. 4c–4d are perspective and side views, respectively, of an alternate embodiment of the base insert of FIG. 3.
Figure 4D:
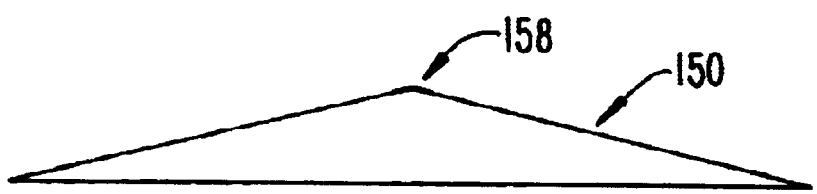

Although the base insert 150 has been described with reference to a plurality of pathways 154 corresponding to a plurality of openings 108 in the base 100, it will be appreciated that base insert 150 and base 100 could include a number of different configurations. For example, the base insert 150 could be in the shape of a cone having a substantially centrally-disposed common area 158 and a continuous or sectional sloping surface emanating from the central area 158, as illustrated in FIGS. 4c and 4d. In this embodiment, base 100 could be provided with a continuous opening formed along the entire side of base 100 and in communication with the sloped side portion of base insert 150 so that an object could roll down the sloped side of the base insert 150 and through some random point along the opening in base 100.

Figure 5A:
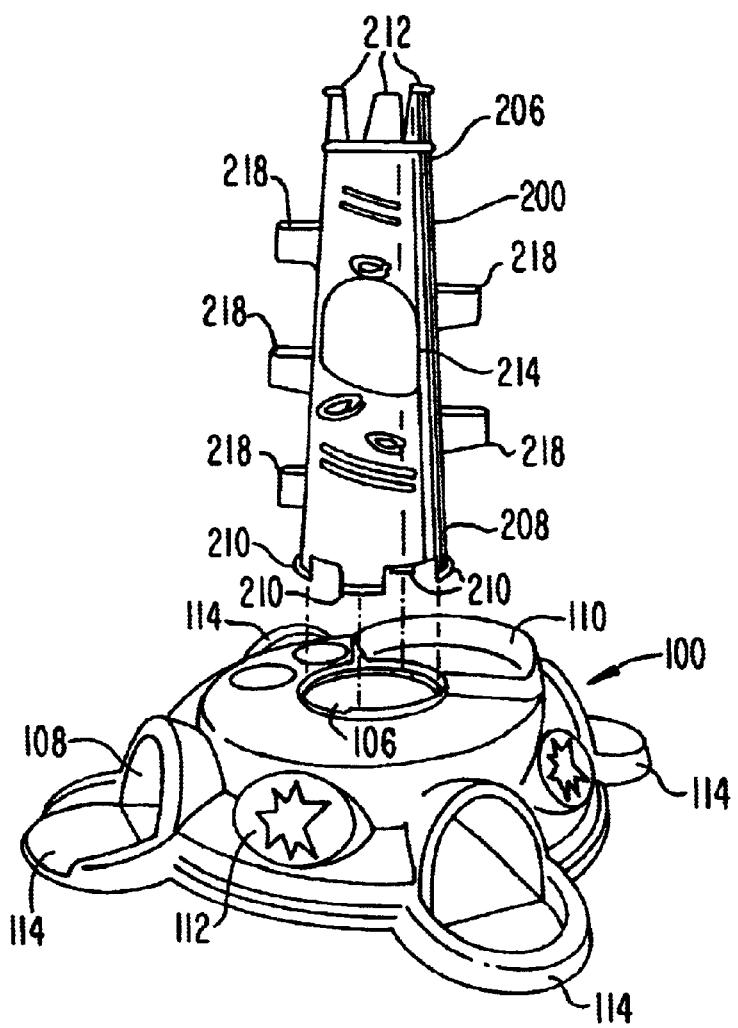
FIG. 5a is a perspective view of the combination of a support and the base of FIG. 3.
Figure 5B:
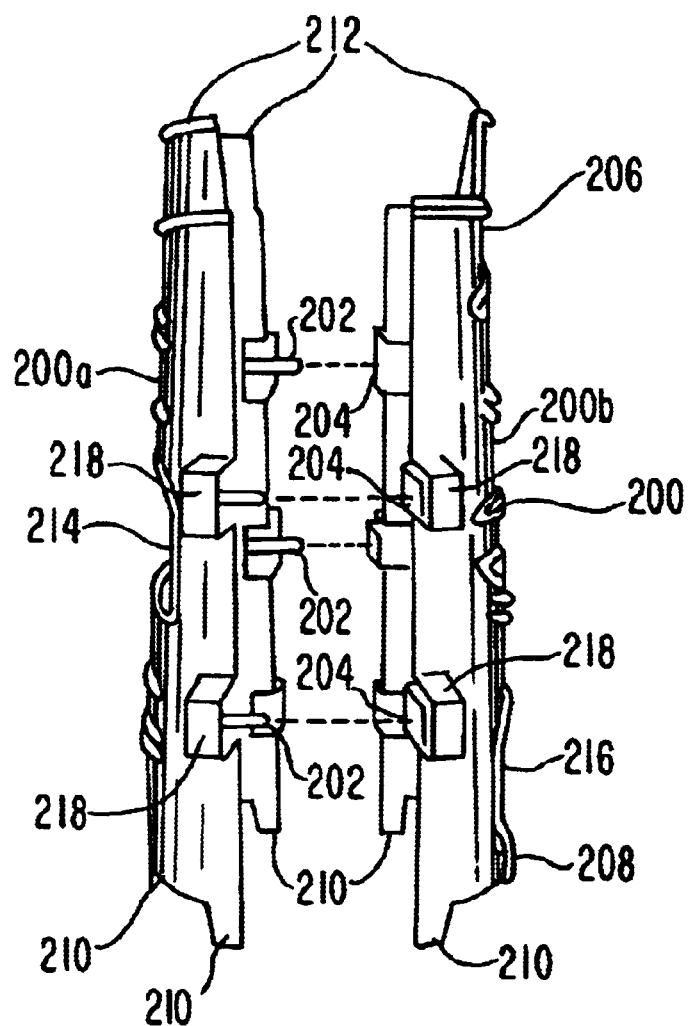

Referring now to FIGS. 5a–5b, there is shown an exemplary support 200 for use in the present invention. Support 200 is dimensioned and constructed to support the top 300 and to provide structural stability to support the weight of an infant or other small child. In preferred embodiments, support 200 also provides structural stability to the track 400. Support 200 is formed in a substantially cylindrical configuration. Other configurations are possible, such as rectangular. In preferred embodiments, support 200 is formed in a two-piece construction employing two sections, 200a and 200b, as illustrated in FIG. 5b. Support section 200a includes a plurality of locking tabs 202 disposed along the length of support section 200a in spaced-apart relation. Support section 200b includes a plurality of recesses 204 disposed along the length of support section 200b in spaced-apart relation to engage the locking tabs 202. Although support 200 has been described as a two-piece construction, it should be understood by one of ordinary skill in the art that support 200 could also be formed as a one-piece construction. Once assembled, the portions 218 of support 200, which include the interlocking tabs 202 and recesses 204, provide support for the track 400 as will be described in more detail below.

Support 200 includes a first or upper end 206 and a second or lower end 208. Support 200 also includes a plurality of tabs 210 disposed at the lower end 208 in spaced-apart relation and extending from the lower end 208. Tabs 210 are configured to engage openings (not shown) formed in base 100 in order to secure support 200 to base 100. Support 200 could be connected to base 100 by using other well-known connecting mechanisms, such as screws or the like, however, in preferred embodiments, tabs 210 are employed. Support 200 also includes a plurality of tabs 212 disposed at the upper end 206 in spaced-apart relation and extending from the upper end 206. Tabs 212 are configured to engage openings formed in the top activity area 300 (FIG. 2) as will be discussed in more detail below.

Support 200 preferably includes two openings 214, 216 formed in the sidewall thereof. Each of openings 214, 216 are dimensioned and configured to allow an object to pass through each of openings 214, 216 into an interior passageway, which extends through support 200 from the upper end 206 to the lower end 208. The interior passageway is in communication at the lower end 208 with the opening 106 in the top of base 100 to allow an object to pass through the passageway into the interior of base 100. Likewise, opening 216 is preferably in communication with the end of ramp section 110 disposed on base 100 and opening 106 disposed in the top of base 100 to allow passage of an object through opening 216 into the interior of base 100.

Figure 6A:
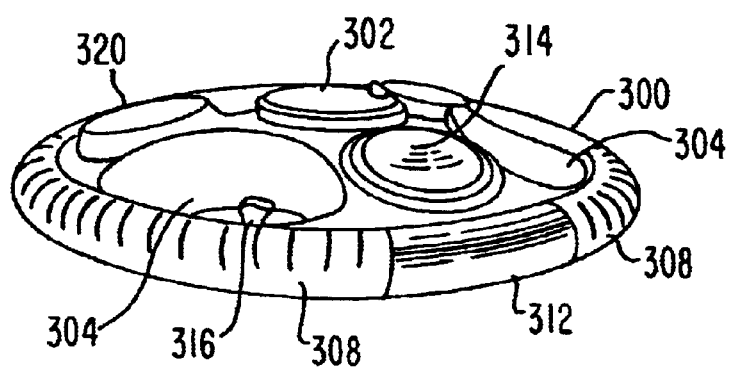
FIGS. 6a–6c are a top perspective view, top view, and bottom perspective view, respectively, of a top activity area for the toy of FIG. 2.
Figure 6B:
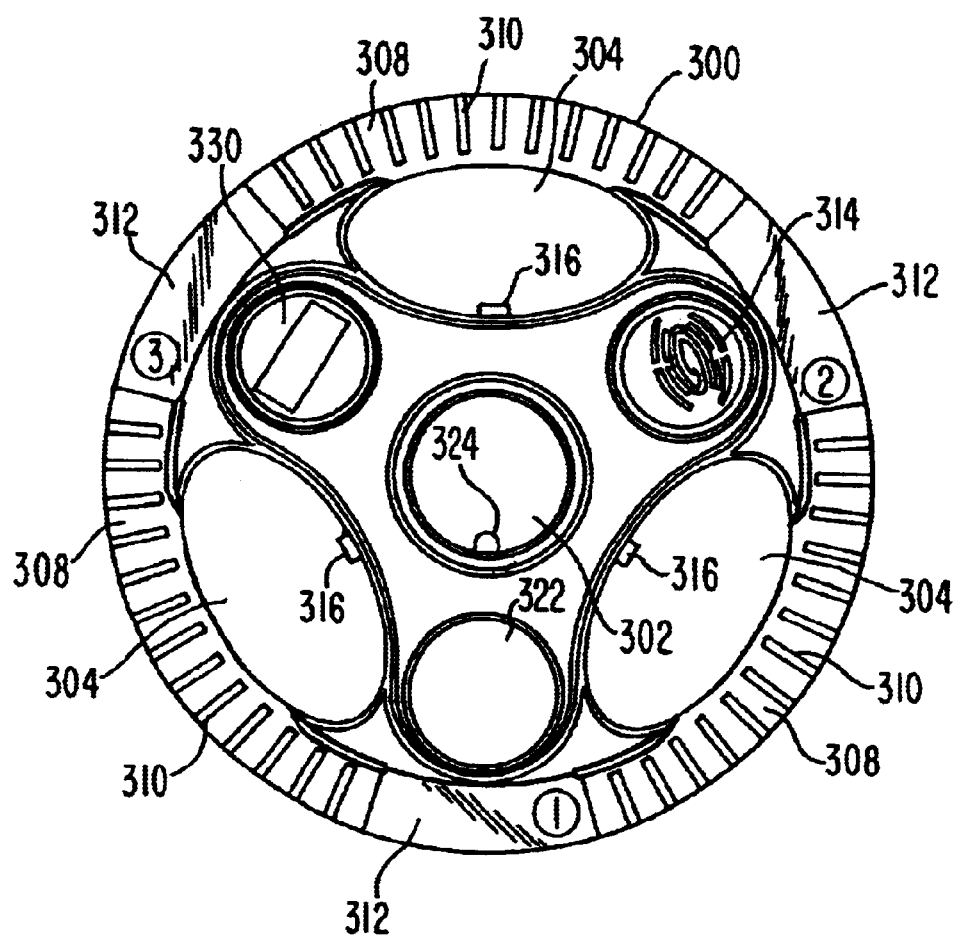
Figure 6C:
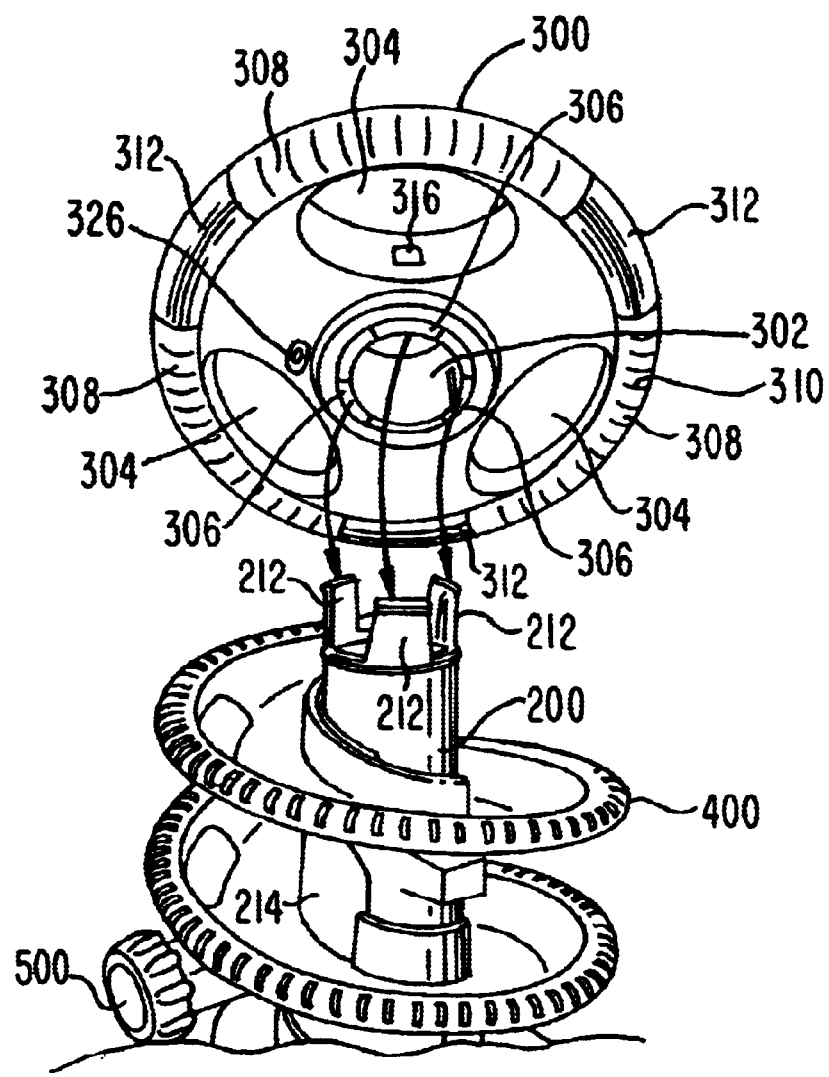
Figure 10A:
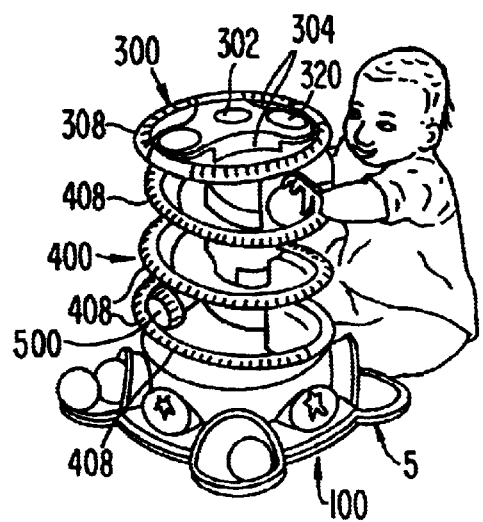
FIGS. 10a–10b illustrate an infant user interacting with the toy of FIG. 2 in a seated and standing position, respectively.
Figure 10B:
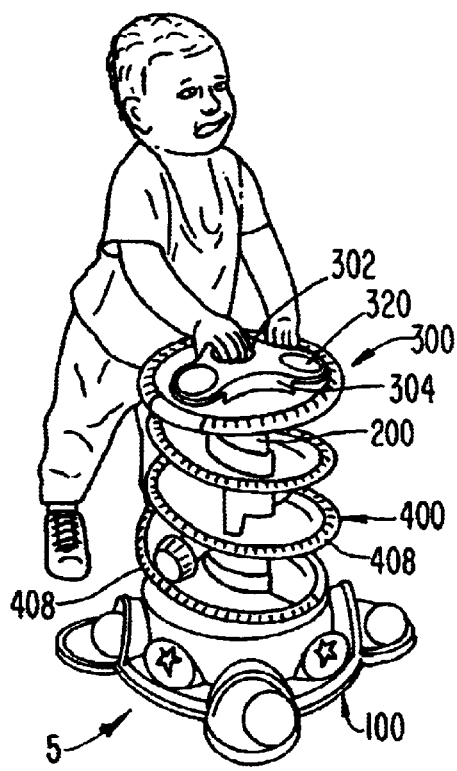

The top or top activity area 300, as illustrated in FIGS. 6a–6c, includes a first opening 302 preferably formed through the center of top 300 and a plurality of openings 304 formed between first opening 302 and the outer edge of top 300 and equally spaced-apart from each other. Any number of configurations for the first opening 302 and the openings 304 could be employed in the present invention. Each of first opening 302 and openings 304 are dimensioned to allow an object, for example, a ball, as illustrated in FIGS. 10*a* and 10*b*, to easily pass through them.

Top 300 also includes a plurality of recesses 306 disposed about the first opening 302 on the underside of top 300 and in spaced-apart relation, as illustrated in FIG. 6*c*. Recesses 306 are configured to engage the corresponding plurality of tabs 212 disposed on support 200 to provide a connection between top 300 and support 200. Top 300 could also be attached to support 200 using any other well-known connection devices, such as screws, rivets, or the like. Once connected, the first opening 302 in top 300 is preferably in communication with the upper end of the passageway formed through support 200. In this configuration, an object, for example, a ball, can pass through the first opening 302, into the passageway in the support 200, and thereafter into the interior 104 of base 100 through opening 106 in top of the base 100 (this can be referred to as a "ball drop" exercise).

Top 300 also includes a plurality of gripping regions 308 (which may also be referred to as grips or handles) disposed about the perimeter of top 300. For the sake of brevity and clarity, gripping regions, grips, or handles 308 will be referred to herein as grips 308. In preferred embodiments, the grips 308 are formed integrally as part of the top 300. Grips 308 can be formed separately, however, and disposed on the top 300 using any well-known method.

Grips 308 are preferably formed with corrugated or undulating surfaces, knobs, or ridges 310, as best illustrated in FIG. 6*b*. These ridges 310 are designed to provide an enhanced gripping surface. Grips 308 are preferably disposed adjacent the plurality of openings 304 in top 300 and have a generally circular cross section. Grips 308 do not, however, have to be disposed adjacent an opening to allow an infant to grasp the grips 308. Grips 308 can comprise any known and appropriate geometrical shape, such as a square or triangle. Grips 308 are preferably dimensioned so that a small child, such as an infant, can easily grasp the grips 308 by placing a portion of the infant's hand, such as the infant's fingers through an adjacent opening 304 and around the grip 308.

Top 300 also preferably includes a sensory output generator, such as lights 312 and a speaker, with a protective cover, 314 disposed therein. A preferred light for use with the present invention is a 80 mA 60 W light bulb. Lights 312 are preferably disposed about the perimeter of top 300 in spaced-apart relation, however, lights 312 can be arranged in any configuration in top 300. Lights 312 can be provided with a plurality of different colored lenses to provide an array of colors when the lights are activated.

Top 300 further includes a plurality of actuators 316 disposed in each of the plurality of openings 304. Each of the actuators 316 is operatively coupled in a well-known manner, through, for example, a micro-controller, to each of the sensory output generators, lights 312 and speaker 314, and operable to initiate operation of the lights 312 and speaker 314, when an object passes through opening 304. For example, when an object passes through one of the openings 304, the actuator 316 sends an input to a micro-controller and the micro-controller then provides an output to one of the of lights 312 and speaker 314. This operation will be described in more detail below. The actuators 316 can include any well-known switch or micro-switch which are well known to one of ordinary skill in the art.

Figure 7A:
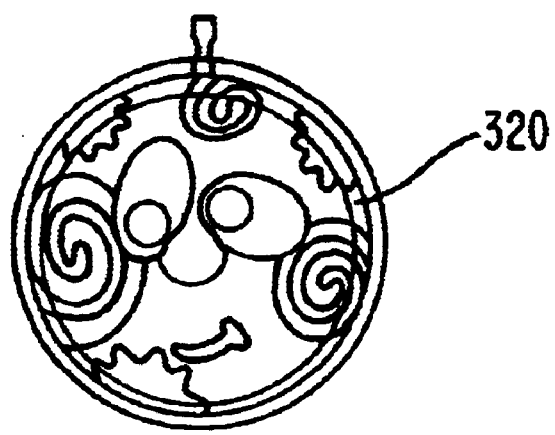
FIGS. 7a–7b are a top and front view of a button on the top activity area of FIGS. 6a–6c.
Figure 7B:
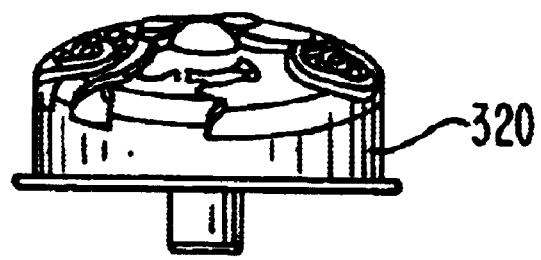

Top 300 also includes a button 320, as illustrated in FIGS. 7*a* and 7*b*, disposed in an opening 322 formed in the upper side of top 300. Button 320 preferably includes graphical features formed therein or disposed thereon. These graphical features can be in the form of an emblem or a sticker depicting an animated face, symbols, or the like. Top 300 further includes an actuator 324 disposed in opening 302. Actuator 324 is operatively coupled in a well-known manner to each of the sensory output generators, lights 314 and speaker 314, and operable to initiate operation of the lights 312 and speaker 314 when an object passes through opening 302. In addition, actuator 324 is operatively coupled to button 320 so that by depressing button 320 actuator 324 is also engaged. In this manner, an object can be placed into opening 302 above actuator 324 and the object will not be released until a user forces the object past the actuator 324 or by depressing button 320 and releasing actuator 324. Such dual functionality adds to the overall entertainment value of the toy to the infant user. Actuator 324 can include any well-known switch or micro-switch which are well known to one of ordinary skill in the art.

An on-off switch 326 is also disposed on the underside of top 300. In a preferred embodiment, on-off switch 326 has a low-on and high-on position, which are operatively coupled to the speaker 314 to control the audible output level of speaker 314. In addition, top 300 also includes a cover plate 330 disposed over an opening formed in the top. Cover plate 330 can include a graphical feature such as an emblem, company logo, or the like. A battery of the type that is well known in the art is preferably disposed in the opening under cover plate 330.

Track or ramp 400 (FIG. 2) is disposed between the top 300 and the base 100. Track 400 is preferably composed of a plurality of interconnecting track sections, 400*a*, 400*b*, and 400*c*, as illustrated in FIG. 8, which cooperate to form a plurality of descending levels, preferably forming a spiral, between the top 300 and the base 100. It should be understood by one of ordinary skill in the art that track 400 could comprise a single-track section, or more than the preferred three track sections. The number of track sections depends on the desired height of toy 5. Each of track sections 400*a*, 400*b*, and 400*c* includes an outer wall 402, an inner wall 404, and a bottom 406 forming a channel or pathway for an object, for example, a ball, to descend from the top 300 to the base 100. As illustrated in FIGS. 2 and 8, the inner wall 404 of track section 400*b* preferably includes a cut out section 405 which communicates with opening 214 formed in the side wall of support 200.

Each of the track sections 400*a*, 400*b*, and 400*c*, like top 300, also preferably include a plurality of grips 408 disposed about the perimeter of track sections 400*a*, 400*b*, and 400*c*. In preferred embodiments, the grips 408 are formed integrally at the perimeter of track sections 400*a*, 400*b*, and 400*c*. Grips 408 can be formed separately, however, and disposed on the track sections 400*a*, 400*b*, and 400*c* using any well-known method. Grips 408 are preferably formed with corrugated or undulating surfaces, knobs, or ridges 410. These ridges 410 are designed to provide an enhanced gripping surface. Grips 408 are preferably formed with a generally circular cross section. Grips 408 could, however, comprise any known and appropriate geometrical shape, such as a square or triangle.

Each of track sections 400a, 400b, and 400c also include a plurality of openings 412 formed in the outer wall 402 adjacent grips 408 and in spaced-apart relation along the length of the track sections 400a, 400b, and 400c. Grips 408 and openings 412 are preferably dimensioned and configured so that a small child, such as an infant, can easily grasp the grips 408 by placing a portion of the infant's hand, such as the infant's fingers through an adjacent opening 412 and around the grip 408. Grips 408 do not have to be disposed adjacent an opening to allow an infant to grasp the grips 408. In preferred embodiments, each of track sections 400a, 400b, and 400c, in combination with the support 200, are designed to withstand a force of at least about fifty pounds applied to each of the track sections 400a, 400b, and 400c. The weight capacity of the device could easily be modified to accommodate heavier individuals by changing the appropriate dimensions of the support 200 and track sections accordingly and such changes are well within the scope of the present invention. Such capacity allows the toy to support the weight of an infant or other young child using the grips 408 to support his or her own weight while, for example, pulling up into a standing position from a seated position or while in the standing position. This action will be described in more detail below.

Track sections 400a and 400b include bosses 414 extending from one end of grips 408. Track sections 400b and 400c each include apertures 416 formed in an opposite end of grips 408. Bosses 414 are positioned to engage the apertures 416 when the track sections are in the interconnected configuration. Track sections 400a and 400b also include tabs 420, one of which is partially illustrated in FIG. 8, disposed at the lower end of each track section and extending downwardly therefrom. Track sections 400b and 400c include apertures 422 disposed at the upper end of each track section and positioned to engage the tabs 420 of the corresponding track sections when the track sections are in the interconnected configuration. In addition, track section 400a includes a mounting tab 424 which is used to couple track section 400a to the support 200, and specifically to the upper track support 218, using a screw or any other similar device. Track section 400e also includes a tab 426 disposed at a lower end thereof and extending downwardly therefrom which is used to engage a corresponding recess (not shown) on the top of base 100 and adjacent ramp section 110. In this configuration, the lower end of track section 400c communicates with the upper portion of ramp section 110. As such, the plurality of track sections 400a, 400b, and 400c are coupled to each other and the interconnected track sections are coupled to the support 200 and base 100. Other configurations of track connections to the support and base and to each other could be employed in the present invention and are well known to those of ordinary skill in the art.

Referring to FIGS. 9a and 9b, track section 400b preferably includes a deflecting gate, shown generally at 500, disposed thereon adjacent the cut out section 405 of the inner wall 404 of track section 400b. The gate 500 is also adjacent the opening 214 in the side wall of support 200 when the track section 400b is in the interconnected configuration with the support 200. Gate 500 includes a knob 502 configured and dimensioned such that a child, specifically an infant, using the device can easily grab knob 502 with the infant's hand. The knob 502 is coupled to a shaft 504 extending therefrom. Knob 502 has a flat surface that can accommodate an emblem or similar graphic attribute. The shaft 504 can be formed integrally with knob 502 or could be formed separately and coupled to knob 502 using any well-known method. Gate 500 also includes an extension 506 disposed on shaft 504 and configured to conform to the shape of the bottom 406 of track section 400b when the extension 506 is in the closed position, as illustrated in FIG. 9b. The extension 506 is opened by selectively rotating coupled knob 502 so that the extension is in the path of an object traveling along track section 400b. When the object strikes extension 506 the object is directed towards opening 214 in support 200 whereby it travels down the passageway formed in support 200 to the base 100. Gate 500 is coupled to the bottom portion of track section 400b using a mounting block 508. Mounting block 508 includes a plurality of holes configured to engage a plurality of mounting bosses 510 disposed in a correspondingly fashion upon the bottom side of track section 400b.

Unless otherwise indicated herein, it is to be understood that the component parts of the present invention are preferably made from a polymer material, which is sufficiently durable and safe for use with infants and children of toddler age.

Having described the structural features of the present invention, attention will now be given to the operation of the invention. A young child or infant playing with the toy of the present invention in the seated position is illustrated in FIG. 10a. In the seated position, an infant can place objects, such as balls, in the track and watch as they roll down the track and disappear into the base through the openings described above and then reappear through one of the openings formed in the base. As noted above, the infant can also selectively open and close gate 500 so that a ball rolling down the track will be deflected into the opening in the side wall of support 200 when the ball contacts the gate 500.

In order to transition from the seated position (FIG. 10a) to the standing position (FIG. 10b), the infant can grasp one of the grips 408 disposed on the plurality of levels of track 400 and successively grasp higher level grips 408, including the grips 308 disposed on the top 300. The infant's weight will be supported by the construction of the device as described above. Once in the standing position, the infant user can drop balls down the central opening 302 in the top 300 or one of the plurality of openings 304 in the top 300. If the infant chooses the central opening 302, the infant can push the ball through the opening 302 or use the button 320 to release the ball through the opening 302. The actuator disposed in opening 302 will be engaged in either instance and will operate one or both of the sensory output generators in the manner discussed in more detail below. The ball will then continue down the internal passageway of the support 200 and out one of the plurality of openings formed in the base 100 depending upon in which direction the diverter directs the object within the interior of base 100. On the other hand, if the infant places a ball through one of the plurality of openings 304 formed in the top 300, the ball will engage the actuator disposed in that opening, which will engage one or more of the sensory output generators in the manner discussed in more detail below. The ball will continue through the opening 304 and drop onto a portion of the track 400 disposed directly below the opening. The object will then continue down the track 400 and into the base 100 via ramp 110. Alternatively, the infant can selectively open gate 500 which will deflect the ball into the interior passageway of support 200 whereby the ball will travel into the base and out one of the plurality of openings, again depending upon the action of the diverter on the ball.

The additional features disposed at the top activity area 300, including the sensory output generators and the plurality of openings for the infant to place balls through, encourage the infant to transition from the seated to the standing position. The sturdy construction of the grips 408, 308 incorporated into the track 400 and the top 300, respectively, along with the support 200 and base 100 facilitate the transition from the seated position to the standing position. As the infant interacts with the toy, the infant is encouraged and enticed, through the combination of lights, sounds, and visual effects of the balls rolling down the track or through the passageway of the support 200, to make the transition from the seated position to the standing position by using the plurality of grips to pull himself or herself up into the standing position. These functions entertain the child while at the same time promote the child's gross motor development.

In preferred embodiments, the sensory output generators, for example, lights 312 and speaker 314, are triggered in various sequences according to which of the actuators 316, 324 disposed in top 300 are triggered during an infant's interaction with the toy. For ease of reference, the lights 312 will be referred to herein below as lights 1, 2, and 3, as illustrated in FIG. 6b. Light 1 is disposed adjacent button opening 322. Light 2 is disposed adjacent speaker 314. And light 3 is disposed adjacent cover 330.

When a ball or other object is released down the central opening 302 disposed in top 300 thereby triggering actuator 324, a sound effect will be generated by speaker 314, for example, a beep, laugh, spring sound, or other similar generated sound. The sound effect will play for about two seconds. At the same time, the lights will be activated and deactivated for approximately the same amount of time in the following pattern: 1, 12, 123, 21, 1, OFF, 1, 13, 132, 31, 1, OFF. When a second ball or other object is released down the central opening 302, a song will be generated by speaker 314, and will play for about eight seconds. The lights will also be activated and deactivated in the sequence described above during this time period. Depressing button 320 disposed on top 300 and operatively coupled to actuator 324 will also activate the sensory output generators in the manner described above. It should be understood by one of ordinary skill in the art that the sound effect and song could play for longer or shorter times than the preferred times noted above and that a different sequence of light activation and deactivation can be employed depending upon the application.

Likewise, when a ball or other object is released down one of the plurality of openings 304 disposed in top 300, thereby triggering one of actuators 316, a specified light pattern along with a sound effect and segment of the song will be generated by the lights 1, 2, and 3 and speaker 314, respectively. In preferred embodiments, each of actuators 316 will trigger unique light patterns. For example, if the actuator 316 disposed in opening 304 between the button opening 322 and cover 330, as illustrated in FIG. 6b, is activated by an object passing through the opening 304, the following light sequence is generated for approximately ten seconds: 1, 2, 3, 1, 2, 3, 1, 2, 3, 1, 2, 3. On the other hand, if the actuator 316 disposed in opening 304 between cover 330 and speaker 314 is activated, the following light sequence is generated for approximately ten seconds: 2, 3, 1, 2, 3, 1, 2, 3, 1. Finally, if the actuator 316 disposed in opening 304 between speaker 314 and button opening 322 is activated, the following light sequence is generated for approximately ten seconds: 3, 1, 2, 3, 1, 2, 3, 1, 2. In preferred embodiments, a ball or other object passing through one of the plurality of openings 304 thereby triggering one of the actuators 316 will not interrupt a song or sound effect currently being generated.

The various features of the invention have been described in relation to a toy. However, it will be appreciated that any of the features, such as the base, support, plurality of grips, and top activity area, for example, can be used on a child's physical therapy treatment device, and the features described are not limited to use on toys. Moreover, variations and modifications exist which would not depart from the scope of the invention. A number of these variations have been set forth above.

What is claimed is:

1. A toy, comprising:
   a base;
   a support coupled to said base and extending upwardly therefrom, said support including an upper end and a lower end;
   a ramp coupled to said support and extending from proximate said upper end to said base, said ramp being configured to guide an object from said upper end of said support to said lower end of said support;
   a first handle coupled to said support, said first handle including a first opening formed in said ramp;
   a second handle coupled to said support, said second handle including a second opening formed in said ramp, said second handle disposed between said first handle and said base to allow the infant user to reach said first handle; and
   an activity area coupled to said upper end of said support and disposed at or above said first handle, said activity area having an object disposed thereon.

2. The toy of claim 1, wherein said activity area comprises a gripping region disposed thereon.

3. The toy of claim 1, wherein said ramp is a spiral ramp disposed around said support.

4. A toy, comprising:
   a base;
   a support having an upper end and a lower end and coupled to said base and extending upwardly therefrom;
   a spiral track, said spiral track being coupled to said support;
   a plurality of handles coupled to said support and spaced between the upper end and the lower end of said support, each of said plurality of handles being disposed on said track and including an opening formed in said spiral track; and an activity platform coupled to the upper end of said support and having an object disposed thereon.

5. The toy of claim 4, wherein said spiral track forms a plurality of levels between said activity platform and said base.

6. The toy of claim 4, wherein said activity platform comprises a gripping region disposed thereon.

7. A toy, comprising:

a base having an interior and an exterior;

a support coupled to said base and extending upwardly therefrom, said support having a passageway disposed therein extending from an upper end of said support to a lower end of said support and communicating with the interior of said base such that an object placed in the upper end of said support travels along the passageway from the upper end to the lower end and enters the interior of said base; and a track coupled to said support and extending between said upper end and said lower end, said track including a gripping region disposed on said track and an opening disposed in said track adjacent said gripping region, whereby an infant user can grasp said gripping region by placing a portion of a hand of the infant user through said opening and around the adjacent gripping region.

8. The toy of claim 7, wherein said track communicates with the interior of said base such that the object exits said track and enters the interior of said base.

9. The toy of claim 7, wherein said support further includes an opening disposed therein between the upper end and lower end of said support and in communication with the support passageway such that an object can pass through said opening in said support and into said support passageway.

10. The toy of claim 9, further comprising:

a gate disposed adjacent said opening in said support for selectively diverting an object from said track into said opening in said support.

11. The toy of claim 7, wherein said base further comprises a plurality of openings disposed in said base and a plurality of pathways disposed in the interior of said base communicating with said plurality of openings for guiding an object from the interior of said base to the exterior of said base.

12. The toy of claim 11, further comprising:

a diverter disposed in the interior of said base for directing the object through one of said plurality of openings in said base.

13. The toy of claim 7, wherein said base further comprises an opening formed therein such that an object can travel from the interior of the base to the exterior of the base.

14. A toy, comprising:

a base having an interior and an exterior;

a support coupled to said base and extending upwardly therefrom, said support having a passageway disposed therein extending from an upper end of said support to a lower end of said support and communicating with the interior of said base such that an object placed in the upper end of said support travels along the passageway from the upper end to the lower end and enters the interior of said base;

a top coupled to said support and having an opening formed therein in communication with the upper end of the support passageway such that an object placed in the opening of said top travels through the opening into the support passageway; and a track coupled to said support and extending between said top and said base, said track being in communication with said passageway, said track including a gripping region having an opening disposed in said gripping region, whereby a user can use said gripping region in said track to pull up and reach said top.

15. The toy of claim 14, wherein said track forms a plurality of levels.

16. The toy of claim 14, wherein said track communicates with the interior of said base such that the object exits said track and enters the interior of said base.

17. The toy of claim 14, wherein said top further comprises a gripping region disposed about the perimeter of said top.

18. The toy of claim 14, wherein said support further includes an opening disposed therein between the upper end and lower end of said support and in communication with the support passageway such that an object passes through said opening in said support into said support passageway.

19. The toy of claim 18, further comprising:

a gate disposed adjacent said opening in said support for selectively diverting an object from said track into said opening in said support.

20. The toy of claim 14, wherein said base further comprises a plurality of openings disposed in said base and a plurality of pathways disposed in the interior of said base communicating with said plurality of openings for guiding an object from the interior of said base to the exterior of said base.

21. The toy of claim 20, further comprising:

a diverter disposed in the interior of said base for directing the object through one of said plurality of openings in said base.

22. The toy of claim 14, wherein said base further comprises an opening formed therein such that an object can travel from the interior of the base to the exterior of the base.

23. The toy of claim 14, further comprising:

a sensory output generator; and an actuator operatively coupled to said sensory output generator and operable to initiate operation of said sensory output generator.

24. The toy of claim 23, wherein said actuator is disposed in said opening in said top and is actuated by an object passing through said opening in said top.

25. The toy of claim 23, wherein said sensory output generator generates visible output.

26. The toy of claim 23, wherein said sensory output generator generates audible output.

27. A toy, comprising:

a base having an interior and an exterior;

a support coupled to said base and extending upwardly therefrom, said support having a passageway disposed therein extending from an upper end of said support to a lower end of said support and communicating with the interior of said base such that an object placed in the upper end of said support travels along the passageway from the upper end to the lower end and enters the interior of said base;

a top coupled to said support and having a first opening and a second opening disposed therein configured to allow passage of an object therethrough, said first opening in communication with the upper end of the support passageway such that the object travels through said first opening into the support passageway, said top having a gripping region disposed about the perimeter of said top adjacent said second opening; and a spiral ramp coupled to said support and extending between said top and said base and forming a plurality of descending levels, said ramp configured for guiding an object from the upper end of said support to the lower end of said support and for communicating with the interior of said base.

28. The toy of claim 27, wherein said ramp includes a gripping region disposed on said ramp and an opening disposed in said ramp adjacent said gripping region, whereby the infant user can use said gripping region to pull up and reach said top.

29. The toy of claim 27, wherein said ramp is configured such that as the object passes through said second opening the object drops onto a portion of said ramp below said second opening.

30. The toy of claim 27, wherein said support further includes an opening disposed therein between the upper end and lower end of said support and in communication with the support passageway such that an object passes through said opening in said support into said support passageway.

31. The toy of claim 30, further comprising:

a gate disposed adjacent said opening in said support for selectively diverting an object from said ramp into said opening in said support.

32. The toy of claim 27, wherein said base further comprises a plurality of openings disposed in said base and a plurality of pathways disposed in the interior of said base communicating with said plurality of openings for guiding an object from the interior of said base to the exterior of said base.

33. The toy of claim 32, further comprising:

a diverter disposed in the interior of said base for directing the object through one of said plurality of openings in said base.

34. The toy of claim 27, wherein said base further comprises an opening formed therein such that an object can travel from the interior of the base to the exterior of the base.

35. The toy of claim 27, further comprising:

a sensory output generator; and a first and a second actuator operatively coupled to said sensory output generator and operable to initiate operation of said sensory output generator.

36. The toy of claim 35, wherein said first actuator is disposed in said first opening in said top and is actuated by an object passing through said first opening and wherein said second actuator is disposed in said second opening in said top and is actuated by an object passing through said second opening.

37. The toy of claim 35, wherein said sensory output generator generates visible output.

38. The toy of claim 35, wherein said sensory output generator generates audible output.

39. The toy of claim 27, wherein said ramp comprises a plurality of interconnected sections.

40. The toy of claim 27, wherein said ramp comprises a plurality of sections communicating with said support passageway to form a continuous path for an object between the upper and the lower end of said support.

41. A method of using a toy having a base, a support coupled to the base and extending upwardly therefrom, an upper gripping region coupled to the support, a spiral track coupled to the support, a lower gripping region disposed on the spiral track and disposed between the upper gripping region and the base, the lower gripping region including an opening in the track, and an activity area coupled to an upper end of the support and disposed at or above the upper gripping region, the method comprising the steps of:

grasping the lower gripping region;

grasping the upper gripping region to reach a standing position and the activity area; and performing an activity in the activity area while in the standing position.

42. The method of claim 41, further comprising the steps of:

holding the upper gripping region while performing the activity in the activity area.

* * * * *